(12) United States Patent
Kariniemi

(10) Patent No.: US 10,023,234 B2
(45) Date of Patent: Jul. 17, 2018

(54) ARCUATE FRAME FOR A VEHICLE

(71) Applicant: Stephen Kariniemi, Scottsdale, AZ (US)

(72) Inventor: Stephen Kariniemi, Scottsdale, AZ (US)

(73) Assignee: Stephen Kariniemi, Scottsdale, AZ (US)

( * ) Notice: Subject to any disclaimer, the term of this patent is extended or adjusted under 35 U.S.C. 154(b) by 0 days.

(21) Appl. No.: 15/385,837

(22) Filed: Dec. 20, 2016

(65) Prior Publication Data

US 2017/0096174 A1 Apr. 6, 2017

Related U.S. Application Data

(63) Continuation-in-part of application No. 14/249,460, filed on Apr. 10, 2014, now Pat. No. 9,493,191.

(60) Provisional application No. 61/812,146, filed on Apr. 15, 2013.

(51) Int. Cl.
| | |
|---|---|
| *B62D 21/03* | (2006.01) |
| *B62D 21/18* | (2006.01) |
| *B62D 25/20* | (2006.01) |
| *B62D 23/00* | (2006.01) |
| *B60G 11/04* | (2006.01) |

(52) U.S. Cl.
CPC ............ *B62D 21/183* (2013.01); *B60G 11/04* (2013.01); *B62D 23/005* (2013.01); *B60G 2204/121* (2013.01); *B60G 2300/07* (2013.01); *B60Y 2200/124* (2013.01); *B60Y 2410/124* (2013.01); *B62D 21/03* (2013.01); *B62D 25/20* (2013.01)

(58) Field of Classification Search
CPC .... B62D 21/03; B62D 21/183; B62D 23/005; B62D 25/20
See application file for complete search history.

(56) References Cited

U.S. PATENT DOCUMENTS

| | | | | |
|---|---|---|---|---|
| 2,177,896 | A | * | 10/1939 | Lee ..................... B62D 23/005 296/205 |
| 4,049,309 | A | * | 9/1977 | Seal ...................... B62D 21/08 264/219 |
| 2004/0239091 | A1 | * | 12/2004 | Horton .................. B62D 21/02 280/781 |
| 2010/0320023 | A1 | * | 12/2010 | Rhodig .................... B62D 9/02 180/400 |

(Continued)

FOREIGN PATENT DOCUMENTS

DE 102007053355 A1 * 5/2009 ........... B62D 23/005

OTHER PUBLICATIONS

Computer translation of DE 102007053355A1 (Year: 2018).*

*Primary Examiner* — Gregory A Blankenship
(74) *Attorney, Agent, or Firm* — Ryan Kariniemi

(57) ABSTRACT

An All-Terrain Vehicle with a frame comprising an arcuate shape or an elevated portion with an apex. In one embodiment, the arcuate shape or elevated portion with an apex is located between a rear axis and a front axis such that there is additional clearance over a typical non arcuate frame or a flat frame for a given ride height. The arcuate shape may be a lateral arcuate shape. The frame may also provide for additional structural strength. The frame may also include the ability to attach periphery accessories such as an engine cage, a passenger cage, trailing arms, power train and transmission.

2 Claims, 7 Drawing Sheets

(56) References Cited

U.S. PATENT DOCUMENTS

| | | | | |
|---|---|---|---|---|
| 2015/0266349 A1* | 9/2015 | Nolan | .................. | B62D 21/183 |
| | | | | 244/2 |
| 2015/0375803 A1* | 12/2015 | Raska | ..................... | B60G 3/20 |
| | | | | 280/639 |
| 2016/0059895 A1* | 3/2016 | Kariniemi | ............ | B62D 21/183 |
| | | | | 280/781 |
| 2016/0332676 A1* | 11/2016 | Miller | ...................... | B60P 1/04 |
| 2017/0073008 A1* | 3/2017 | Padhye | ................. | B62D 39/00 |
| 2017/0096174 A1* | 4/2017 | Kariniemi | ............ | B62D 21/183 |
| 2017/0225728 A1* | 8/2017 | Nolan | .................... | B62D 57/04 |
| 2017/0297627 A1* | 10/2017 | Deckard | ................. | B60N 2/01 |

\* cited by examiner

ARCUATE FRAME FOR A VEHICLE

CROSS-REFERENCES TO RELATED APPLICATIONS

The present application is related to and claims priority to U.S. Provisional Application No. 61/812,146, filed Apr. 15, 2013, entitled "An Arcuate Frame For A Vehicle" and U.S. application Ser. No. 14/249,460, filed Apr. 10, 2014, entitled "Arcuate Frame For A Vehicle", the entire contents of which are incorporated herein by reference for all purposes.

FIELD OF THE INVENTION

The present invention generally relates to 4 wheeled vehicles, and more specifically to all-terrain vehicles

BACKGROUND OF THE INVENTION

All-terrain vehicles (hereinafter "ATV") typically have a shorter wheelbase which gives the ATV increased maneuverability over longer wheelbased ATVs such as sandrails, desert trucks, and dune buggies. The shorter wheelbase however can have shortcomings compared to a longer wheelbase. Some shortcomings may be that the occupancy area can be restricted, the center of gravity can be higher, can have a rougher ride, and less horsepower.

Recreation vehicles such as sandrails, dune buggies, and desert trucks, typically have more horsepower, more clearance or able to raise the vehicle to get more clearance, more room for passengers and cargo, and may even have a lower center of gravity than their shorter wheelbased counterparts. Currently, short wheelbased and long wheelbased ATVs have a frame that is flat and generally parallel to the ground. A characteristic of flat frames (and more pronounced in the long wheelbased ATVs) is that even though the ride height can be increased (to increase clearance) by having larger wheels and tires (the ride height can be at the center of the wheels) and raising the frame up this may come at the expense of losing droop (axle movement in the vertical direction at the wheel). This can be at least partially compensated for by lowering the transmission, but this can create a susceptible "hang up" point. An increase in axle movement in the vertical direction (e.g more droop), the easier it is for a vehicle to accommodate differences in terrain.

It remains desirable to have a vehicle or vehicle frame that can more effectively deflect obstacles and protect the transmission, and allow for increased ground clearance without sacrificing droop (without lowering the drive train below the frame, thus creating a susceptible "hang up" point with terrain obstacles).

Definitions

Droop—the amount of vertical motion that an axle (on the wheel side) on a vehicle can drop below the ride height.

Ride Height—amount of space between the base of an automobile tire (the portion contacting the ground) and the underside of the chassis; or, more properly, to the shortest distance between a flat, level surface, and any part of a vehicle other than those parts designed to contact the ground (such as tires, tracks, skis, etc.). Ground clearance is measured with standard vehicle equipment, and for cars, is usually given with no cargo or passengers.

SUMMARY OF THE INVENTION

It has been recognized that it would be advantageous to develop a structural frame for ATVs, which has increased ground clearance without losing droop and not having a stepped down drive train. In one embodiment, an arcuate frame (or substantially arcuate frame) that supports a substantial portion of the vehicle, and has a longitudinal length (length measured from rear end to front end along a straight line) of approximately 70% of the longitudinal distance between the front and rear wheels measured in a straight perpendicular line between the front wheel axis and rear wheel axis, and provides a clearance at the center or mid point between the front and rear wheels that is greater than a non arcuate frame without sacrificing droop. The longitudinal length of the arcuate frame as a percentage of the perpendicular longitudinal length between a straight axis connecting the center of the front wheels and a straight axis connecting the center of the rear wheels can vary. It may be 40%, 50%, 60% or 80%, 90% or even 100%. It may depend on the length of the arcuate portion, i.e how high of a clearance is desired, or it may depend on the length of the A-arms and trailing arms for example. In addition, it may provide a non stepped or "glancing blow" protection via the substantially arcuate frame when an obstacle is encountered underneath the vehicle frame. The structural frame may comprise a support structure that provides an arcuate shape from near the front axle to near the rear axle and where the arcuate shape is designed to create more clearance and allow for more droop than a vehicle without an arcuate shape or elevated portion without dropping the drive train below the frame. In one embodiment, a frame has a continuous arcuate shape from the rear axle to the front axle. The portion of the frame that has the arcuate shape may be substantially under the passenger compartment of the ATV. Additionally to an arcuate frame along the ATV length, an arcuate frame may exist along the ATV width or laterally. For example, a lateral arcuate frame may exist between the ATV front wheels. In one embodiment, an arcuate frame extends from one front wheel to another front wheel (if front A-arms are also in an arcuate shape). The substantially arcuate shape may also be more structurally rigid than a non substantially arcuate frame. The structural frame may enable attachment of peripheral structural structures such as an engine cage, a passenger cage, trailing arms, A-arms and other peripheral structures that are known in the art.

In various embodiments, a support frame can be constructed to comprise a front periphery, a rear periphery opposite the front periphery, a first side periphery, a second side periphery opposite the first side periphery, a top periphery, a bottom periphery opposite the top periphery and a center portion within the bounds of the peripheries. The front of a vehicle is in the direction of forward motion and the rear is in the direction of rearward motion and a length between the front and rear is a longitudinal length. The center portion can be made up of trusses or it can be a substantially solid within the periphery (e.g a sheet of material). The center portion can be arcuate from the front periphery to the rear periphery and thus may have an apex between the front and rear boundary at the midpoint of vehicle or the midpoint of the distance between the front and rear wheels. The arcuate frame may be symmetrical along the longitudinal arcuate length between the front periphery and rear periphery or it may also not be symmetrical. In one embodiment, the substantially arcuate frame is symmetrical along its arcuate length from the front end to the rear end and the apex of the arcuate frame is in the middle of the vehicle as measured between the front and rear wheels (or the front wheel center axis and the rear wheel center axis). For example, if the vehicle is in forward motion, the longitudinal arcuate frame may provide a clearance at the front wheel axis, and the clearance increases along the longitudinal arcuate shape until the apex, which may be at the midpoint between the front wheel axis and the rear wheel axis, and then the clearance decreases along the arcuate shape until it reaches the clearance at the rear wheels or rear wheels axis which may be the same clearance as the front wheel axis clearance. Then the clearance may rise again in front of the front wheel axis and behind the rear wheel axis. The apex can be a part of a continuous arc or radius, or it may have a length, e.g. the apex is a flat (or straight or another arcuate shape) portion in the "arc". The flat portion can vary and still be within the scope of the invention. In one embodiment the flat portion may be less than 30% of the distance between front and rear wheels. In other embodiments it is less than 15%, 10%, 5%, or 1% or less. The apex can be elevated above an imaginary straight line or plane connecting the front and rear ends of the frame.

Additional features and advantages of the invention will be apparent from the description which follows, taken in conjunction with accompanying drawings, which together illustrate, by way of example, features of the invention.

DETAILED DESCRIPTION

Figure 1:
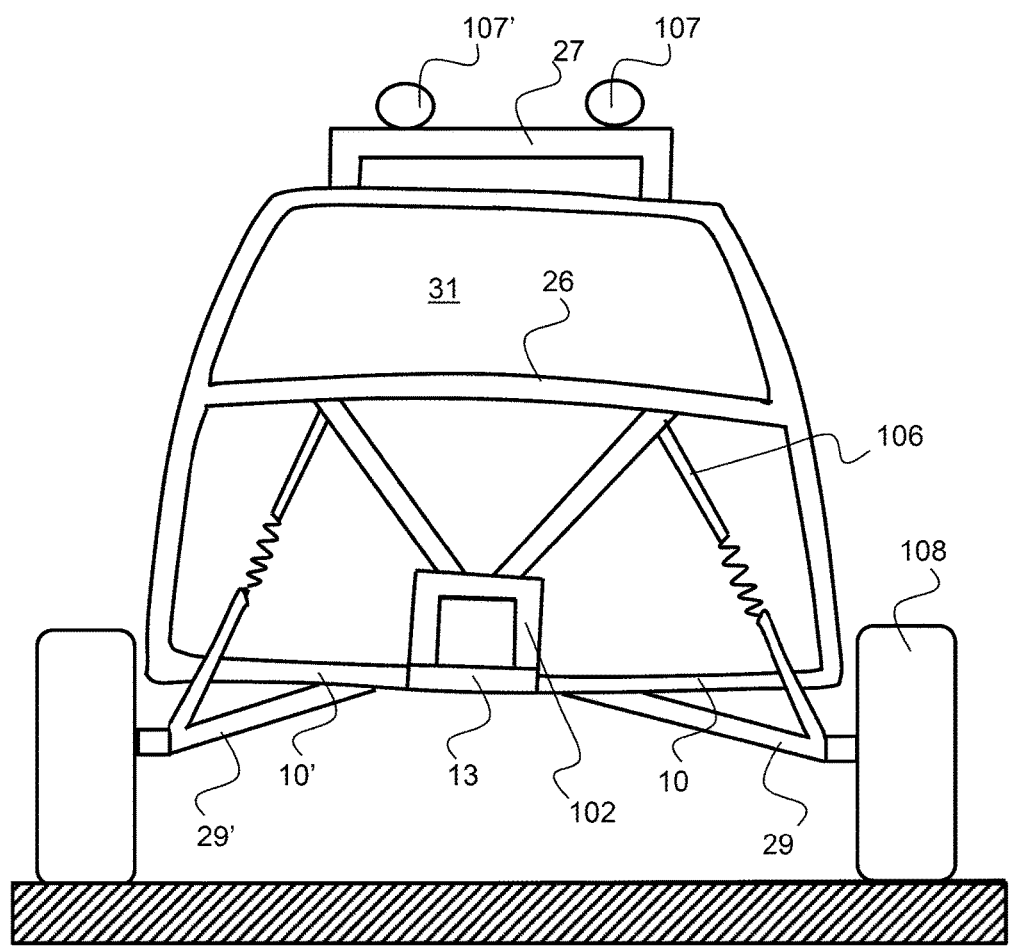
FIG. 1 is a partial front view of an ATV arcuate structural frame with a passenger cage and front peripheral structures, attached A arms and wheels, attached shocks and lights in accordance with an embodiment.

Reference will now be made to some embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The structural frame may support different sections of the ATV. For example, the frame may support the passenger compartment area 100, and/or the engine compartment 101 area, and/or the front ferring section 102 area. It should be noted that the structural frame may have an arcuate shape under the passenger compartment area 100 and/or it may have an arcuate shape under the front ferring portion and/or it may have an arcuate shape along front portion of frame supporting passenger compartment. In one embodiment, the ATV has an arcuate shape, with an apex, extending between rear wheel axis and front wheel axis (a longitudinal arcuate shape) and an arcuate shape, having an apex, extending along front portion of passenger support section (lateral arcuate shape). In one embodiment the longitudinal arcuate shape has a longitudinal arcuate shape rear end and a longitudinal arcuate shape front end and the longitudinal arcuate shape rear end is lower than the longitudinal arcuate shape front end. In one embodiment, the lateral arcuate shape has a lateral arcuate shape first end and a lateral arcuate shape second end and a lateral arcuate shape apex between the lateral arcuate shape first end and lateral arcuate shape second end and the lateral arcuate shape apex meets with or near the longitudinal arcuate shape front end or front portion of the passenger support section. In some embodiments the lateral arcuate shape may be along the front portion of the passenger support section. In some embodiments the lateral arcuate shape may be along a lateral center line. The lateral arcuate shape may be in various desired locations along a longitudinal length of the passenger support section or along a longitudinal length between front wheel axis and rear wheel axis or in front of front wheel axis or behind rear wheel axis. It should also be noted that the structural frame can be made up of one component or multiple components. It should also be understood that the invention is not limited by how it is made as described herein.

An ATV with an arcuate frame in accordance with various embodiments are disclosed herein and examples are illustrated in the figures. For example, the structural frame, passenger compartments and engine compartments may be constructed from a structural component or member, e.g., a truss or joist made out of a tubular-shaped steel alloy. However, the ATV frame and peripheral structural accessories may be assembled out of any rigid or semi-rigid material or cross sectional shape. The structural component may have a tubular construction typically ranging from approximately 0.5 inches to 3 inches in diameter or whatever diameter is required for adequate strength. The longitudinal length of the vehicle varies according to individual needs but in one example, the vehicle described herein has a length from a front axle to a rear axle of approximately 9 feet 2 inches. The overall longitudinal length may be extend past the front and rear wheels. The arcuate concave support frame is configured to allow attachment of a passenger compartment 100 intended to provide adequate room to accommodate at least one passenger but also allows for up to 3 or more passengers as described herein. The passenger compartment 100 may also include storage locations that can be modified per individual preferences. The passenger compartment 100 is generally no wider than the width of the support frame, but the width can be tailored to desired sizes. The maximum clearance can be at the center of the vehicle or the midpoint between the front and rear axles.

In various embodiments, an ATV with an arcuate frame includes at least one passenger compartment with other peripheral attachments. For example, as shown in FIG. 1, shocks 106, lights 107, wheels 108, front ferring 102, A Arms 29 and 29', a front window 31, and a roll bar 27 may be attached. The front ferring 102 may have receptacles for receiving the lights 107. The lights were purchased from an ATV accessory store. The front window 31 may be formed into the passenger compartment 100 by utilizing a lateral cross member 26 that extends from the passenger side of the compartment to the driver's side of the compartment. The ATV may further be configured to receive propulsion and braking activation accessories. Foot pedals for propulsion and braking activation can be purchased from ATV parts supplier. Braking reservoirs can also be purchased from auto or ATV suppliers.

Figure 1A:
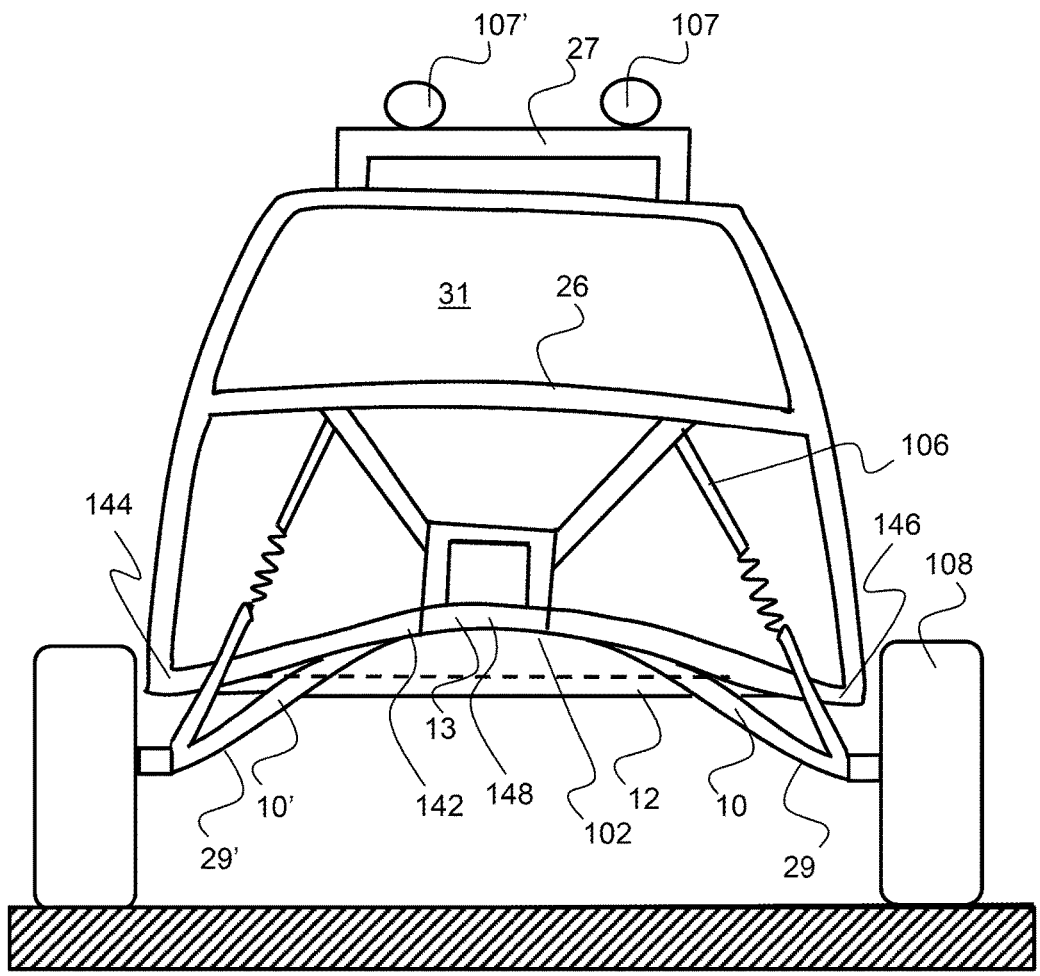
FIG. 1A shows a front (lateral) arcuate frame.

In an alternative embodiment, as shown in FIG. 1A, the ATV may have a lateral arcuate shape 142 along a passenger support section 18. The lateral arcuate shape 142 may extend between the ATV front wheels. The lateral arcuate shape 142 has a lateral arcuate shape first end 144 and a lateral arcuate shape second end 146 and a lateral arcuate shape apex 148 between the lateral arcuate shape first end 144 and lateral arcuate shape second end 146 and the lateral arcuate shape apex 148 may meet with or near the longitudinal arcuate shape front end 11 or in other embodiments a front portion of the passenger support section 18. The lateral arcuate shape first end 144 may meet with passenger side truss 10' and lateral arcuate shape second end 146 may meet with drivers side truss 10. For example, passenger support section 18 may have a lateral arcuate shape 142 extending along front portion truss members 17, 11, and 17' between side trusses 10 and 10' as shown in FIG. 3A. The front A-Arms 29' and 29 may also be shaped in a lateral arcuate shape (or the A-Arms may be straight portions) connecting to a lateral arcuate shape 142 (as shown in FIG. 1A). In one embodiment, the front A-Arms 29' and 29 are shaped in a longitudinal arcuate shape and in a lateral arcuate shape 142. These shapes may be formed by any known means and the passenger support section 18 may be a unibody frame or it may be welded of multiple pieces.

In other embodiments the lateral arcuate shape 142 may be located along other portions of the passenger support section 18. For example, a lateral arcuate shape 142 may be located at a lateral center line 150 on the passenger support section 18. The lateral center line 150 may be located midway between the front wheel axis 124 and the rear wheel axis 126. In some embodiments, there may exist more than one lateral arcuate shape. For example, there may be a lateral arcuate shape at a lateral center line located midway between front wheel axis 124 and the rear wheel axis 126, a lateral arcuate shape 142 along a front portion of the passenger support section 18 and portions in between. There may also exist lateral arcuate shapes 142 located rearward of the lateral center line 150. In one embodiment, the ATV may have a longitudinal arcuate shape 28 with an apex located at lateral center line 150 and longitudinal center line 152 and a lateral arcuate shape 142 with an apex located at the lateral center line 150 and longitudinal center line 152. The lateral arcuate shape 142 may have an apex anywhere between lateral arcuate shape first end 144 and lateral arcuate shape second end 146. In other embodiments a lateral arcuate shape may exist continuously along a longitudinal length of passenger support section 18.

In various embodiments, an ATV with a substantially arcuate frame, may include a passenger compartment, an engine compartment, and/or a front ferring compartment. For example, as shown by way of example in FIG. 2, the passenger compartment 100, front ferring compartment 102, and engine compartment 101 are attached to the substantially arcuate frame 105. The passenger compartment 100 may also have a roll bar 27 attached to it. The roll bar construction may also provide for locations to attach fog lights or other lighting accessories that can be purchased from most any known ATV store.

Figure 2:
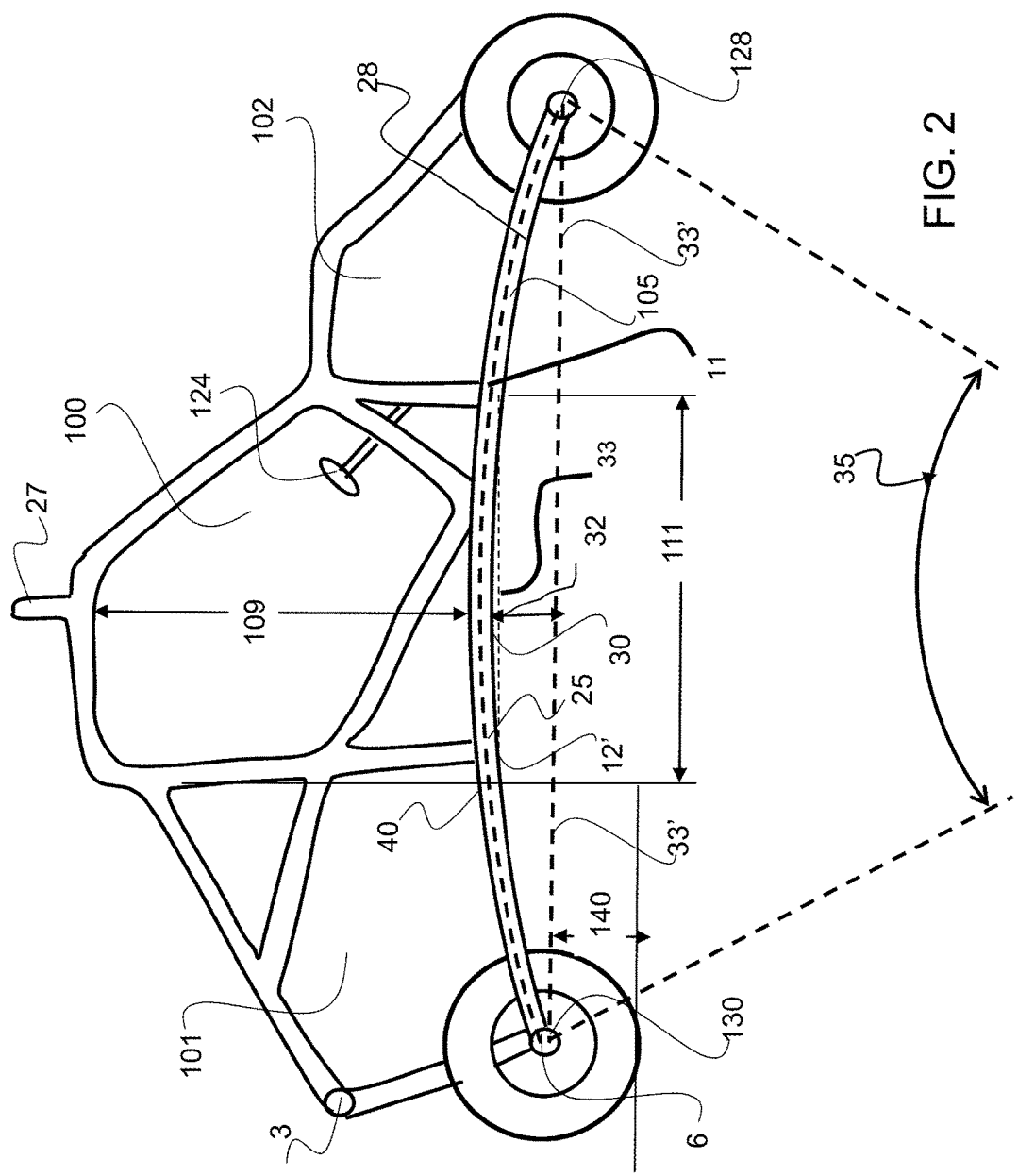
FIG. 2 is a side view of an ATV arcuate structural frame.

In various embodiments, as illustrated as an example, a frame can have an arcuate shape. The arcuate shape can have an apex 30, or a maximum clearance as measured from the surface the tires are on or as measured from a ride height. As illustrated in FIG. 2, the ride height 140 is the clearance from the surface the tires are on to the lowest portion or bottom periphery of the frame. If the frame was not arcuate, and was substantially flat, and it was parallel and in plane with a plane connecting the centers (128, 130) of the front and rear wheels, the maximum clearance would be the same as the ride height. With an arcuate frame, the maximum clearance is greater, depending on how much of a radius is in the arcuate shape or how much the frame is elevated above the ride height. In some cases, in order to gain maximum clearance, the parallel frame is raised above the ride height. When a parallel or non arcuate frame is raised above the ride height, the axle may be angled (this can be at least in part compensated by lowering the transmission below the frame and thus create a potentially susceptible place for the ATV to get hung up on when obstacles are encountered), and using up a portion of the total amount of droop available, or the amount the axle is allowed to fall when the wheels do not have contact with the riding surface. With an arcuate frame, a portion of the center portion, typically near the front and rear end, can be at the same height or near the same height as the ride height or the centers (128,130) of the wheels. In one embodiment, a portion of a center portion (the center portion comprises any material that is between the front end, rear end, first side, second side, top side and bottom side of a frame) is at the same height as the center (128,130) of the wheels. In one embodiment, a portion that is in line with the rear wheel axis 126 and the front wheel axis 124 is the rear end and front end of the frame. In one embodiment this puts the transmission inlet approximately 4 inches (or half the distance of the total diameter of the gears) above the center (130) of the wheels and approximately 4 inches above line 33'.

In various embodiments, the passenger compartment can have various dimensions. In one embodiment, as shown by way of example in FIG. 2, the passenger compartment height 109, from the top of the passenger compartment 100 to the bottom of the apex 30 of the substantially arcuate frame or elevated portion is approximately 3 feet 8 inches but can vary depending on desired space. In one embodiment, the passenger compartment width 110 (and passenger support frame width) is approximately 6 feet 4 inches wide and the passenger compartment length 111 (and passenger support frame length) is approximately 6 feet 4 inches long and the length between the wheel is 9 feet 2 inches. The length of the frame is in a longitudinal direction and the width of the frame is in a lateral direction. Any desirable configuration may be shaped.

Figure 3:
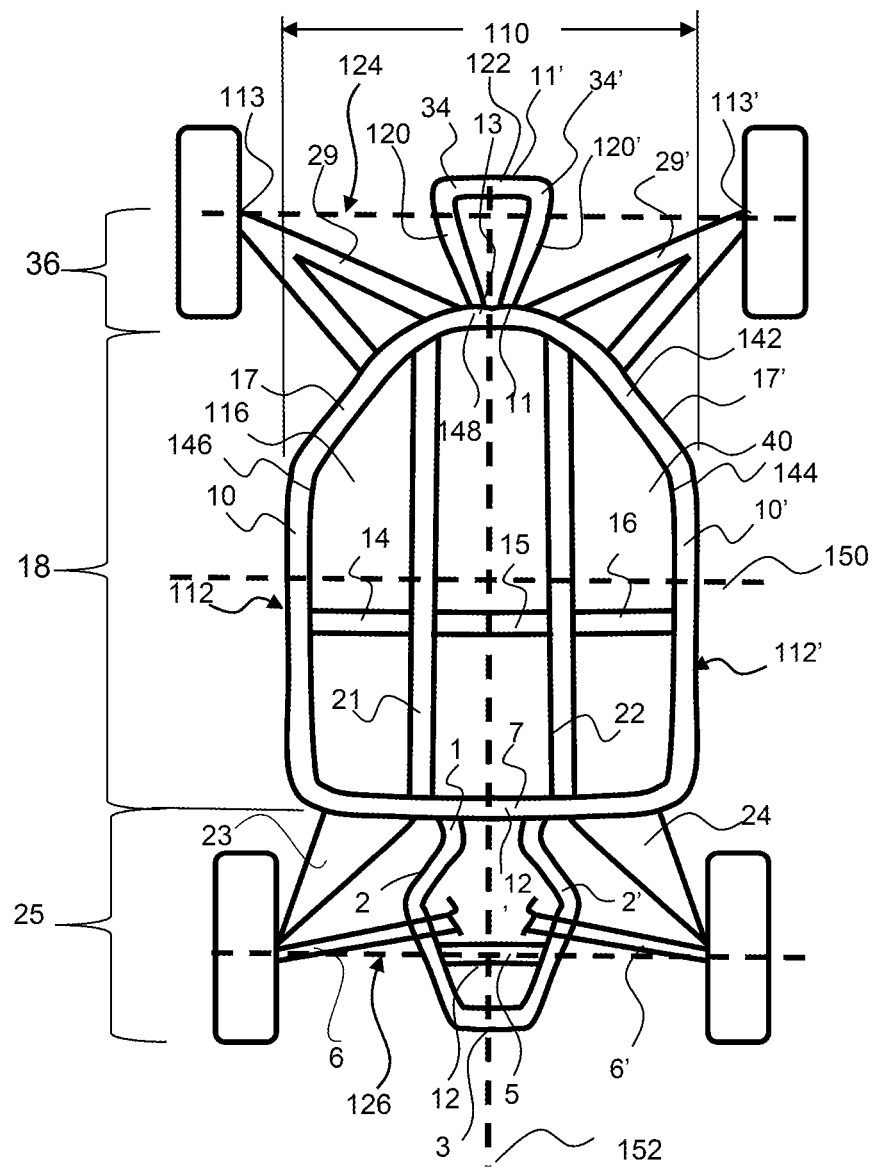
FIG. 3 is a plan view of an ATV with an arcuate structural frame.

In various embodiments, the ATV with an elevated portion on a frame, can have various configurations. For example, as shown in FIGS. 2 and 3, the frame may be configured for a rearward engine compartment 101 intended to at least partially surround, or act as a boundary for, the engine, power train, and/or transmission of the vehicle. A structural portion beneath the engine referred to as an engine support section 25 may be shaped to be substantially in a radius of curvature of the substantially arcuate shape 28 of the structural frame 105 continued on from a passenger support section 18. The arcuate shape 28 may be a longitudinally arcuate shape, meaning the arcuate shape has an apex between the front wheel axis 124 and the rear wheel axis 126. A front ferring support section 36 of the frame 105 may also be in the substantially arcuate shape 28 continued from the passenger support section 18. In one embodiment, a portion of the front ferring section may be in the arcuate shape when a portion is behind the front axis 124 of the front wheels. In another embodiment a portion of the front ferring section is diverging away from the riding surface, e.g. when the front ferring section is in front of the front axis 124 of the front wheels. The substantially arcuate shape, can be determined by fitting a line from a rear end to a front end of the frame through the components or trusses or sheet making up the arcuate portion, and having the components being within approximately 2 inches of the fitted line. The frame may be made of a structure having a front end, a rear end, a top boundary, a bottom boundary, a first side, a second side, and shaped into a continuous arcuate shape by forming multiple bends or angles, and thus having multiple straight or curved portions separated by bends (or arcuate portions separated by bends) and each straight or arcuate portion being within 2 inches of a fitted arcuate line. In one embodiment the straight (or arcuate) portions are within ½ inch of a fitted line thus making it difficult to see that it is not in a substantially perfect arcuate shape or radius.

In one embodiment, a rear end 12 of an engine support section 25 of a frame may become the rear end of the structural frame as a whole. The structural frame 105 may be substantially under a passenger compartment 100, or it may continue on under the engine support section 25 but it is not a requirement that the frame have an engine support section 25 or a front ferring section 36. In one embodiment, a structural support frame 105 is substantially under a passenger compartment 100 and does not have an engine support section 25, a rear end 12' is bounded as a rear truss 7. In another embodiment, where a structural support frame has an engine support section 25 as shown in FIG. 3, a rear end 12 is bounded as a second lateral support truss 5. In these described embodiments the front end 11 (without a front ferring section 36), is bounded as the front lateral truss 13 and trusses 17 and 17'. The front end of the arcuate frame may be in line with the front wheels or it may be in front of the front wheels or it may be behind the front wheels. In one embodiment, the front end of the frame is behind the wheels, and the A-arms connect from the front end to the front wheels via an axle. The rear end of the arcuate frame may be in line with the rear wheels or it may be in front of the rear wheels or it may be behind the rear wheels. In one embodiment, a rear end of the frame is in front of the rear wheel(s), and a trailing arm(s) connects from the rear end(s) to the rear wheel(s) via an axle(s). In one embodiment, a center portion of a frame that is between the center 128 of the front wheels and the center 130 of the rear wheels is in a substantially arcuate shape (an arcuate shape where an apex allows a maximum clearance and may be in a concave shape towards a riding surface) and any remaining center portions of the frame that are in front of the center of the front wheels and behind the center of the rear wheels diverges away from the riding surface.

In various embodiments there may be a front ferring. As an example and illustrated in FIGS. 2 and 3, a front ferring support section 36 is a part of a frame 105, a front end may be 11', bounded by the front ferring support section 36 and trusses 17 and 17'. A center portion 40 may include all structural material within bounds of an outer peripheries of the structural support frame 105. The outer peripheries are the front end 11 or 11', a rear end 12 or 12', a first side 112 or a second side 112', a top side 116 and a bottom side 118. The outer peripheries may comprise trusses 7, 10, 10', 17, 17', 14, 15, 16, 21, 22, the front ferring support section 36, and/or sections 1, 1', 2, 2', 5.

In various embodiments and as illustrated as an example in FIG. 2, an imaginary straight line 33' can be connected from a front end 11 and a rear end 12 or 12'. In one embodiment, a longitudinal support member may not have a lateral cross member. In this case, the imaginary straight line is connected from the front end and the rear end of the longitudinal member. The imaginary (straight) line can be connected between with a tangent line between the bottom most portion of the front end and the rear end as shown in FIG. 2.

In various embodiments and as illustrated in the FIG. 2 as an example, a top side 116 and a bottom side 118 are shown. The top side and bottom side are a periphery, or a plane in some cases, that a cover or skin could be applied along.

An engine may alternatively be supported by a passenger support section 18 or have alternate supports off of the passenger support section 18. An engine compartment 101 may house any engine, such as an Acura 6 cylinder engine with a manual transmission. Such power systems are available from auto salvage yards or may be removed from any desirable auto vehicle or purchased on the open market. The engine may be equipped with a transfer case that includes park and reverse. The engine may also be equipped with a turbo accessory.

A structural support frame 105, or referred to as the frame, may be further configured to receive a steering wheel 127 and instrument panel for direction control and operation of the vehicle. The instrument panel may be equipped with a single round faced VDO instrument cluster that gives a steady flow of information: RPM, speed, odometer, trip odometer, hour meter, engine service light, battery indicator, and fuel gauge with empty, full and intermediate indicators. A steering system may be a rack and pinion design intended to minimize jerking of the steering wheel and maximize control of the vehicle. A winch or other accessories may be attached to a front of the frame and a trailer hitch may be attached to a rear.

In various embodiments, as shown by example in FIG. 3, a frame 105 may be configured to receive trailing arms 23 and 24 and front A arms 29 and 29' for attaching a front axle 113 and 113' and a rear axle 6 and 6'. The A arms 29 and 29' and the trailing arms 23 and 24 may be designed to also substantially or partially lie in an arcuate curve 28 with the structural support frame 105. In one embodiment, the entire structural support frame from near the front axles 113 and 113' to near the rear axles 6 and 6' is in a continuous or substantially continuous arcuate shape 28. The arcuate portion of the frame may start on either side of the axles and continue to either side of the opposite axle. The A arms 29 and 29' and the trailing arms 23 and 24 may also follow the arcuate shape 28. The A arms 29 and 29' and the trailing arms 23 and 24 were attached (in one example) to the structural frame at approximately 10 degrees to approximately follow the arcuate shape 28. The arcuate shape had a radius 35 of approximately 9 feet.

A frame may further be configured to at least partially receive a floor for passengers to place their feet. The floor may be a thinner piece of sheet metal. The sheet metal used (in one embodiment) was approximately ¼ inch thick. A vehicle may further be configured to at least partially receive "skins" or a covering to the vehicle. The covering may be a sheetmetal or other desired covering.

In various embodiments, a frame can comprise an arcuate shape, and shaped in various methods. For example, as shown in FIG. 3, the arcuate frame of passenger section 18 comprises two 1.75 inch diameter steel tubular shaped side trusses 10 and 10' cut to a length of approximately 78 inches. Support member 10 may be along a first side 112, and support member 10' may be along a second side 112' opposite the first side. The trusses were then shaped into an arcuate shape between the rear end 12' and the front end 11. The frame may have at least one center portion 40 that extends between the rear end 12' and front end 11. As shown in FIG. 2, the center portion 40 has approximately 5 inches vertical height of clearance 32 (not shown in FIG. 2) at the apex 30 of the arcuate shape as measured perpendicularly from a straight imaginary line 33 connecting the front facing end 11 and the rear facing end 12'. The height 32, above ride height, of the apex 30 is variable, for example 1, 2, 3, 4, 5, 6, 7, or 8 inches or more, and dependent on the desirable clearance or the distance between the wheels. The greater the distance between the wheels the higher the clearance may tend to be. The arcuate shape may be created by bending in one continuous fixed arc or bending in multiple smaller arcs (or straight portions) to create one substantially arcuate shape. The shaping process can be performed in any known ways in the art. The shaping process may be performed by a metal shaping manufacturer that shapes steel. The shaping process may alternately be made by shaping the trusses over a mandrel such as a 6 inch radius mandrel and creating a number of smaller bends, such as 5 evenly spaced bends along the length (6 portions), in the truss such that the end result of the truss is that it is substantially in an arcuate shape. In other embodiments, there may be more bends and straight portions or there may be a mix of straight portions with arcuate portions. In some embodiments, there may be 4 straight or arcuate portions with 3 bends or angles or 5 straight or arcuate portions with 4 bends or 7 straight or arcuate portions with 6 bends to make up the substantially arcuate shape. Other combinations can be used. The more bends that are used to shape the member the more the end shape may be to a true arcuate or fixed radius shape. In one embodiment there is a continuous arcuate or fixed radius shape. Any known method of bending the tube or truss or sheet or other structural configurations may be used.

Figure 6:
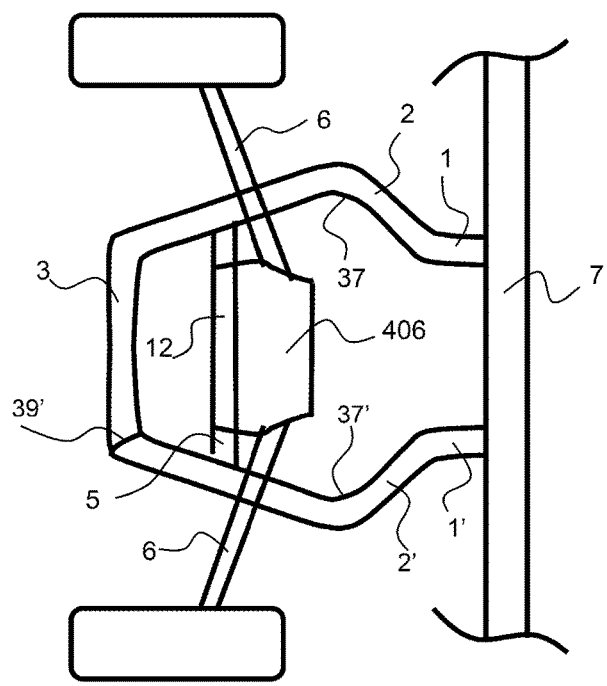
FIGS. 6 and 7 is a plan view and side view of a structural frame that is substantially underneath the engine in accordance with one embodiment.

In various embodiments, an arcuate portion of a frame has a rear end 12 or 12' and a front end 11 or 11' and may have an arcuate shape. The rear end and front end may be in line with the rear wheels and front wheels respectively or they may not be in line. The passenger support section 18 may be in a continuous arcuate shape, the arcuate shape may be continued or substantially continued by A arms 29 and 29' the trailing arms 23 and 24. The arcuate shape may also be continued by the engine support section 25. The engine support section then may diverge into another arcuate shape or straight shape to create clearance. The passenger support section 18 may have a length 111 as measured from rear end to front end (not along the arcuate shape but along a straight line connecting the front end to the rear end) of 30%, 40%, 50%, 60%, 70%, 80%, 90% or more of the total distance as measured between the wheels. In one embodiment, as an example was built with the passenger support section is approximately 69% (as measured from rear end to furthest point of the front end) of the total distance between the wheels and is in a continuous arcuate shape. As shown in FIGS. 3 and 6, the rear end 12 (of the arcuate frame) is near rear axle 6, and more specifically is at a second lateral truss 5. The rear end 12 or second lateral truss may be in front of the rear axle 6 or rear of the rear axle 6. In this embodiment, the apex 30 of the frame, or the portion of the frame that has the most clearance, is approximately 8 inches above ride height, shown as 32' above an imaginary straight line 33' (FIG. 2) drawn from the second lateral truss 5, or rear end 12, to the front lateral truss 13, or front end 11 of the arcuate frame. Line 33' in this case is at the same plane as the ride height 140. The apex 30 in this case is at the midpoint between the front and rear wheels. The apex 30 can have a clearance of whatever is desired. It can be 1, 2, 3, 4, 5, 6, 7, 8, 9, 10, 12 or more inches. In this embodiment, the clearance, or the perpendicular distance from the line 33' to the frame is different than an adjacent point along the arcuate portion of the frame, i.e the frame is not parallel to the imaginary line 33' (in other embodiments there are portions that may be parallel e.g an apex). The radius 35 was approximately 9 feet but can be variable depending on what clearance is desired.

Figure 4:
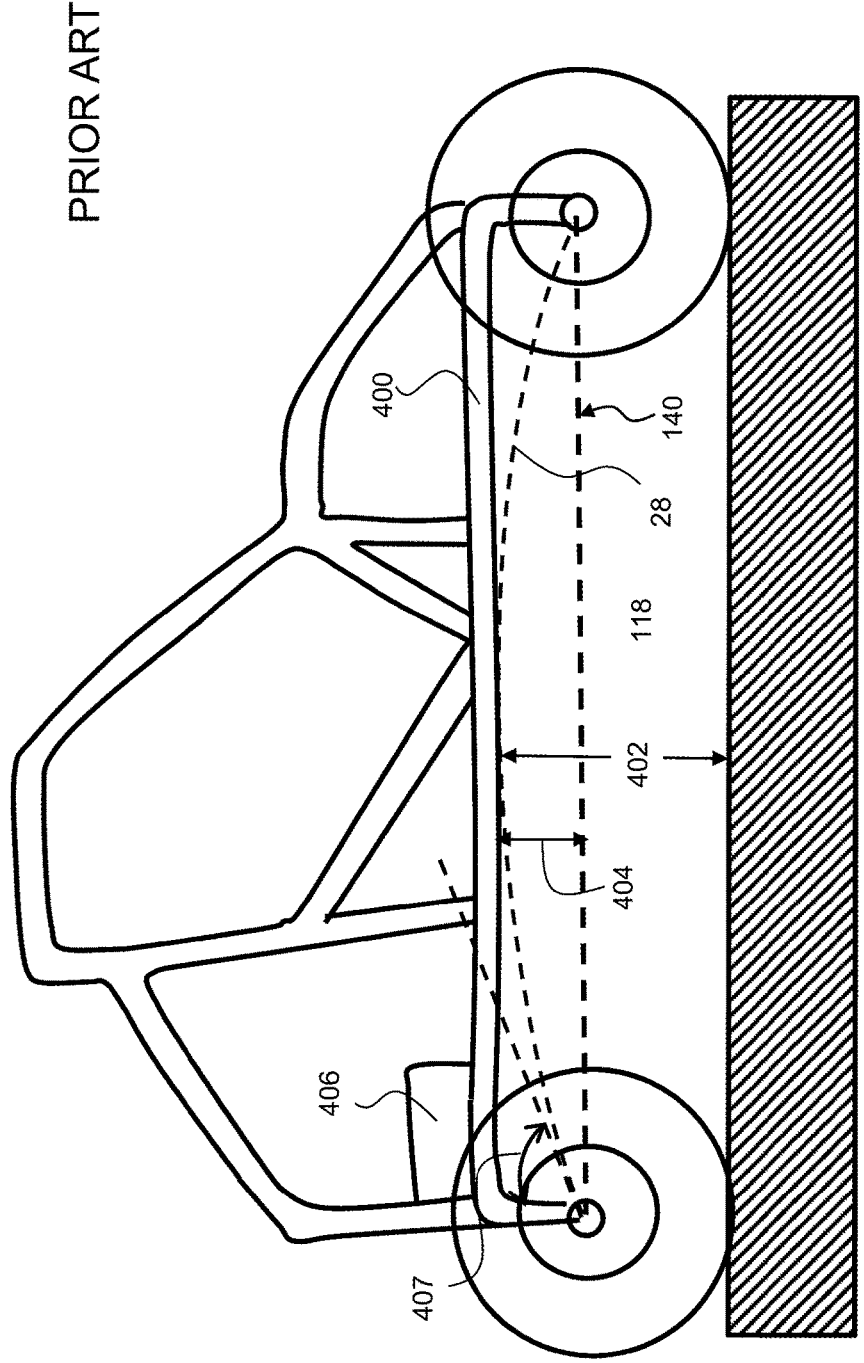
FIG. 4 is a side view representation of previously used frame.

FIG. 4 shows a non arcuate frame 400 that has been raised above ride height 140 to achieve similar clearance 402 as an arcuate shaped frame could achieve as illustrated by line 28. By raising previously used frames 400 you can lose droop as shown by distance 404. In addition, an arcuate frame as illustrated by line 28 may protect the transmission 406 by providing a structure from near an apex of the frame towards a rear end of the arcuate structure. In one embodiment, the frame slopes from the apex to the rear end of the arcuate frame creating a non 90 degree stepped down protection of the transmission so that an obstacle that is encountered under the frame will have less chance of hanging up on the frame. A frame with straight or arcuate portions with bends or angles to create an arc may have an angle (or in case of an arc an equivalent angle) 407 of 45 degrees from a rear end or front end to aid in defending against "hang up" or getting high centered. In other embodiments, the angle is greater than 45 degrees. An arcuate portion from an apex to a rear end can help maximize clearance as compared to a straight section from the apex to the rear end.

Figure 5:
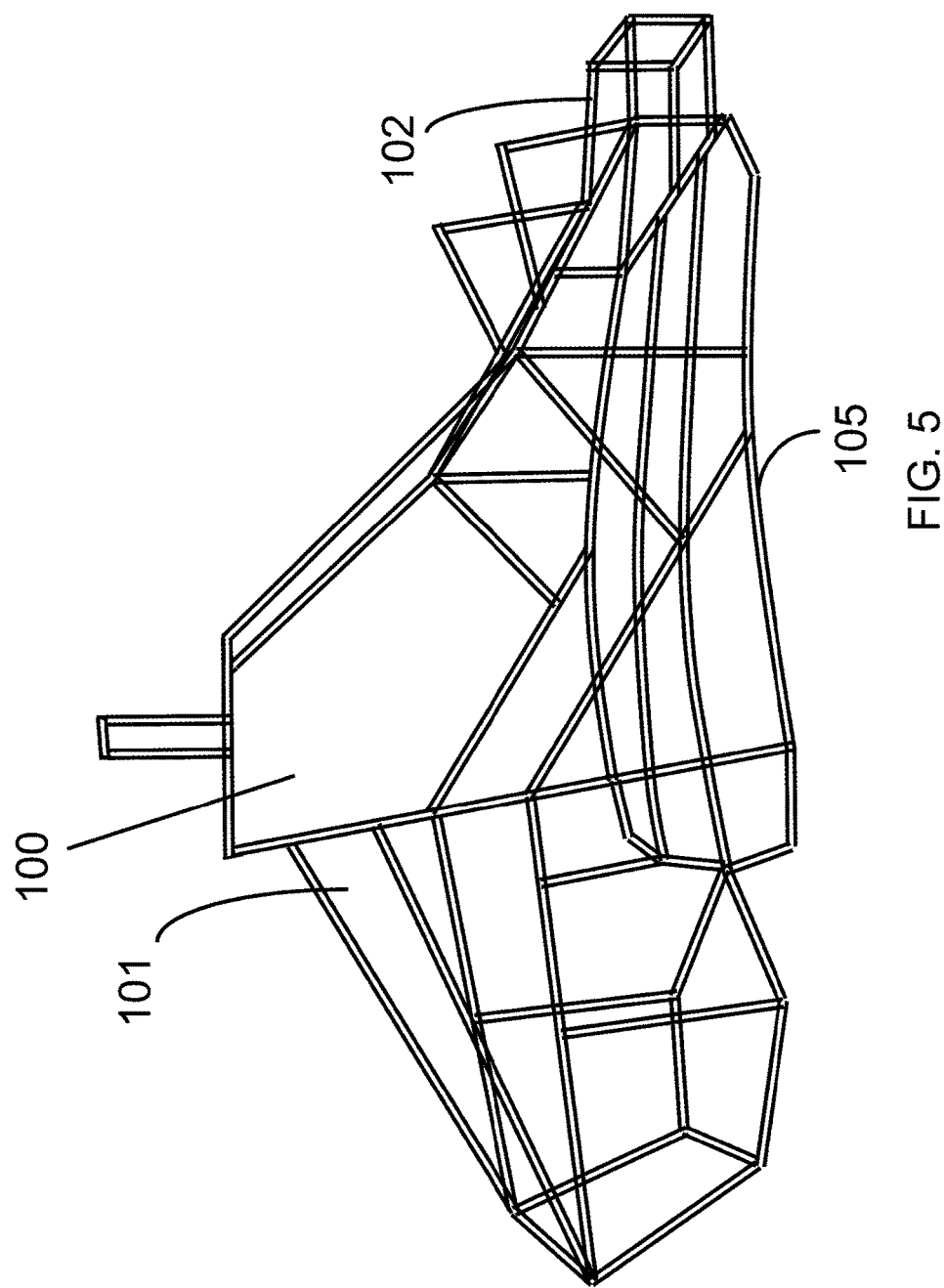
FIG. 5 is a side view of an embodiment of the invention showing an arcuate structural frame with peripheral structural accessories attached.

FIG. 5 shows an example of a chassis for an ATV with an arcuate frame, front ferring section, rear engine section, a passenger compartment and engine compartment and front ferring compartment in accordance with an embodiment of this invention.

Figure 7:
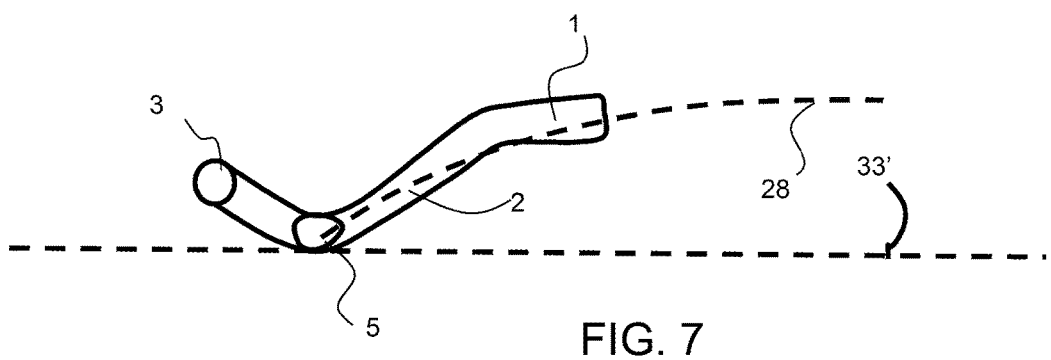

Referring now to FIGS. 6 and 7, the frame may have an arcuate or elevated portion to the rear of the rear axle and to the front of the rear axle. The frame may angle away from imaginary line 33' in a straight or arcuate fashion. In one embodiment, the most rear portion of the structural frame (as compared to a rear portion of the arcuate portion) is the first lateral truss 3. The first lateral truss 3 is elevated above the rear axle. The frame between truss 5 and location 39' can be continuous and on a straight trajectory or an arcuate trajectory. This allows for clearance rear of the rear axle 6. The Sections 1 and 2 can be on the arcuate shape. As shown in FIG. 7, sections 1 and 2 are approximately in a continuous arcuate shape.

The frame can be constructed in various ways and be in the spirit of the invention. One way of constructing the frame is shown by way of an example in FIG. 3. The drivers side or left side truss 10 and the passenger side or right side truss 10' have an end face 34 and 34'. A 23 inch bend radius was formed in truss members 17 and 17' by measuring 35 inches from the end faces 34 and 34' respectively, as shown in FIG. 3. The two side trusses 10 and 10' will have a bend radius portion 17 and 17' such that they are shaped towards the other. The two side trusses 10 and 10' are spaced apart on a surface approximately 64 inches. A front lateral truss 13 was cut to 11 inches and used to join the two arcuate shaped side trusses 10 and 10' together as shown in FIG. 3. The two shaped side trusses 10 and 10' were used as a passenger side truss 10' and as a driver side truss 10. The passenger side truss 10' and the drivers side truss 10' define the left and right or drivers side and passengers side boundaries of the passenger structural support section 18 of the frame. The structural support frame may further comprise a rear cross truss 7 cut to length. In an embodiment, the 1.75" diameter steel tubular rear cross truss 7 was purchased from a steel manufacturer. The rear cross truss 7 was cut to approximately 74 inches. The rear cross truss 7 has a passenger end 19' and a drivers end 19 defining the two ends of the steel tube. The rear cross truss 7 was shaped to have a bend 20 and 20' on each end and were shaped in the same direction. The rear cross truss bends 20 and 20' were created by measuring 7 inches from an end 19 and 19' and shaping a 4 inch radius such that the rear cross truss 7 would join up to the drivers side truss 10 and the passenger side truss 10'. The rear cross truss 7 was attached via welding. Any attachment method known in the relative art may be used. The attachment methods may vary depending on what materials are actually used to create the rigid arcuate structure 105. In one embodiment, the frame 105 may further comprise longitudinal center supports or trusses 21 and 22. Like all the trusses, the longitudinal center supports have a first end and a second end opposite the first end with a center portion between the first end and second end. Two 72 inch long×1.75 inch diameter steel tubes (21 and 22) were shaped in the arcuate shape with approximately a 5 inch apex vertical elevation or 5 inch height from a straight line connecting the two ends, as the two side trusses 10 and 10' were shaped. The two center supports 21 and 22 were attached via welding with one end attached to the rear cross truss 7 and the opposite end attached to trusses 17 and 17' near the front end 11 at a lateral distance from the side trusses 10 and 10' of 22 inches. The frame may further comprise lateral support trusses 14, 15, and 16. In one embodiment, a 1.75 inch diameter steel lateral support truss was purchased from a steel manufacturer at an approximate length of 8 feet. The support was cut into 3 pieces 14, 15, 16 to fit the spaces between the side trusses 10 and 10' and the longitudinal center supports 21 and 22 and between the longitudinal center supports 21 and 22 as shown in FIG. 3. The two lateral supports 14 and 16 that attached to the side trusses 10 and 10' were cut at approximately 22 inches and the other lateral support 15 was cut at approximately 20 inches. The lateral supports 14, 15, and 16 were attached by welding near the apex of the arcuate shape of the longitudinal supports 21 and 22 and the two side trusses 10 and 10'. The a-arms 23 and 24 are shown attached. All the longitudinal portions (10, 10', 17, 17', 21 and 22) were formed into an arcuate shape in a similar manner, i.e by bending over an approximately 6 inch radius mandrel at 5 approximately evenly spaced distances to create a substantially arcuate shape. This example created a passenger support section for a frame.

Referring now to FIGS. 6 and 7, the arcuate frame may further partially comprise an engine support structure 25. The engine support structure may at least partially lie in the arcuate plane of the arcuate frame. When the engine support section diverges upward from the axle height the engine support section can be rearward of the rear axle for more clearance. An engine support section was created as follows: Two 1.75 inch diameter first longitudinal engine trusses were cut to 5 inches and joined to the passenger rear cross joist at a distance approximately 24 inches from the outside edge of the side trusses and angled down such that the pieces were substantially in plane with the arcuate shape of the frame of the passenger support section. Two more second longitudinal engine trusses 2 and 2' of 1.5 inch diameter were cut at a length of approximately 23 inches and a first angle 37, approximately 67 degrees, was placed at a distance of 13 inches along the length of both second longitudinal engine trusses 2 and 2'. A second angle 38 of approximately 25 degrees was shaped upwardly at a distance of 12 inches from the rear end 39 and 39' of the second longitudinal engine supports 2 and 2'. The second longitudinal engine supports 2 and 2' were joined to the two first longitudinal engine supports 1 and 1' such that the first angles 37 and 37' were spaced laterally 32 inches apart. A first lateral engine support 3 was cut to 20 inches and attached to the two rear ends 39 and 39' of the second longitudinal engine trusses 2 and 2'. A second lateral engine truss 5 was cut to 29 inches and attached to the two second longitudinal engine trusses 2 and 2' at a distance of approximately 12 inches from rear ends 39 and 39' of the two second longitudinal engine support trusses 2 and 2'. This example created the engine support section 25 of the structural frame 105.

In various embodiments an arcuate frame may further comprise a front ferring section as shown by example in the figures. The ferring section support may be in a concave arcuate shape 28 towards a riding surface, with one end towards the front of the vehicle and the other end towards the back of the vehicle, e.g when behind the center 128 of the front wheels or the front axis 124. The ferring section may diverge away from the riding surface, e.g when in front of the center 128 of the front wheels or front axis 124. A front ferring section 36 may attach to a passenger support section 18. Two 1.75" diameter steel tube 120 truss approximately 10 inches long was cut and shaped similarly as shown in FIG. 3. This may be the bottom most portion of the front ferring compartment, i.e the front ferring section 36. A cross member 122 may join trusses 120. A front ferring compartment 102 was added to the front ferring support section 36 as shown in FIG. 1. The front ferring support section that was in front of the center 128 of the front wheels diverged away from the riding surface.

In an alternative embodiment, the arcuate structure may be made from a single piece of material such as a metallic alloy sheet and then shaped into an arcuate shape. If a single sheet of material is used as the frame, it will be realized that cross joists and longitudinal trusses that are described herein may not be necessary to provide strength to the frame but still may be desired to be added to the arcuate sheet.

The arcuate shape may start at the rear wheels and end at or very near the front wheels. The arcuate shape may also start and end in a region between the front and rear axles or between the front wheels axis 124 and the rear wheels axis 126. For example, the portion of the frame that is below the passenger compartment may be substantially on the longitudinally arcuate shape and the portion of the frame that is below the engine compartment may have a portion on this longitudinally arcuate shape and another portion not on the longitudinally arcuate shape. Furthermore, the frame may have a portion that has a concave shape, for example a concave shape spanning a distance between the front and rear wheels, and then have a convex shape or diverging up of the frame rearward of the rear wheels. In another embodiment the engine portion of the frame may not have any arcuate shape. The arcuate shape may be made up of more than 1 straight section.

A variety of wheel sizes may be attached to the wheel hub typically ranging from 8 to 18 inches Wide and from 24 to 48 inches in diameter. Additionally, a variety of wheel types may also be attached to the wheel hub ranging from studded, all weather, snow, and sand dune tires. In one embodiment the lateral width of the vehicle, as measured from the vertical plane of the outside wheels does not exceed 100 inches.

It is to be understood that the above reference arrangement are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An All-Terrain Vehicle (ATV) comprising;
a front wheel axis and a rear wheel axis;
a passenger support section having a first side, a second side, and a bottom side;
wherein the passenger support section has a substantially lateral arcuate shape along the bottom side and extending between the first side and the second side and
wherein the passenger support section further comprises a longitudinal arcuate shape.

2. An All Terrain Vehicle comprising;
a front wheel axis and a rear wheel axis;
a passenger support section having a first side, a second side, and a bottom side;
wherein the passenger support section has a substantially lateral arcuate shape along the bottom side and extending between the first side and the second side and wherein the passenger support section further comprises a longitudinal arcuate shape; and
wherein the longitudinal arcuate shape and the lateral arcuate shape have an apex located at same point.

* * * * *